United States Patent
Vela, III (10) Patent No.: US 12,111,036 B2
(45) Date of Patent: *Oct. 8, 2024

(54) SOLAR STREET LAMP

(71) Applicant: Florentino Vela, III, Weslaco, TX (US)

(72) Inventor: Florentino Vela, III, Weslaco, TX (US)

(73) Assignee: Florentino Vela, III, Weslaco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,395

(22) Filed: Aug. 29, 2022

(65) Prior Publication Data

US 2022/0412524 A1 Dec. 29, 2022

Related U.S. Application Data

(63) Continuation of application No. 17/145,246, filed on Jan. 8, 2021, now Pat. No. 11,428,375.

(Continued)

(51) Int. Cl.
*F21S 9/03* (2006.01)
*F21S 8/08* (2006.01)
(Continued)

(52) U.S. Cl.
CPC ............ *F21S 9/035* (2013.01); *F21S 8/086* (2013.01); *F21V 23/001* (2013.01); *F21V 23/06* (2013.01);
(Continued)

(58) Field of Classification Search
CPC . F21S 9/035; F21S 8/086; F21S 9/037; F21V 23/001; F21V 23/06; F21V 5/007;
(Continued)

(56) References Cited

U.S. PATENT DOCUMENTS

| | | | |
|---|---|---|---|
| 6,948,826 B2* | 9/2005 | Fogerlie | F21S 9/037 362/267 |
| 9,046,235 B2 | 6/2015 | Wilson | |
| 10,228,103 B1 | 3/2019 | Zhou | |
| 11,428,375 B2* | 8/2022 | Vela, III | F21V 23/001 |

(Continued)

FOREIGN PATENT DOCUMENTS

| | | | |
|---|---|---|---|
| CN | 201081112 Y | | 7/2008 |
| CN | 204420847 U | * | 6/2015 |

(Continued)

OTHER PUBLICATIONS

English Translation of CN208442738U, A kind of intelligent-induction solar street light, Zheng, Jan. 2019 (Year: 2019).*

*Primary Examiner* — Zheng Song
*Assistant Examiner* — Glenn D. Zimmerman
(74) *Attorney, Agent, or Firm* — Outlier Patent Attorneys, PLLC (57) ABSTRACT

A solar street lamp includes a connecting base configured with a mounting port for mounting the solar street lamp on top of a lamp post. A bottom plate having a rear portion mounted on top of the connecting base includes a lower surface upon which is mounted, in a forward portion of the bottom plate, a plurality of light-emitting modules. A solar panel is supported above the bottom plate and separated from the bottom plate by a wiring gap space. A battery and power supply are mounted below the bottom plate, inside a mounting chamber formed in the connecting base. A rear plug is detachably disposed on a rear edge of the connecting base. Detaching the rear plug provides access for maintenance to the power supply and battery mounted in the mounting chamber and permits the solar panel to be withdrawn from the solar street lamp.

5 Claims, 4 Drawing Sheets

Related U.S. Application Data (60) Provisional application No. 62/958,710, filed on Jan. 8, 2020.

(51) Int. Cl.
  *F21V 23/00* (2015.01)
  *F21V 23/06* (2006.01)
  *F21W 131/103* (2006.01)
  *F21Y 115/10* (2016.01)

(52) U.S. Cl.
  CPC .... *F21W 2131/103* (2013.01); *F21Y 2115/10* (2016.08)

(58) Field of Classification Search
  CPC ............ F21V 17/002; F21W 2131/103; F21Y 2115/10; F21Y 2105/16; Y02B 20/72
  See application file for complete search history.

(56) References Cited

U.S. PATENT DOCUMENTS

| | | | | |
|---|---|---|---|---|
| 2008/0298051 | A1* | 12/2008 | Chu | F21S 9/037 362/183 |
| 2010/0149792 | A1* | 6/2010 | Lu | F21S 8/088 362/157 |
| 2010/0309653 | A1* | 12/2010 | Chu | F21S 9/035 362/183 |
| 2014/0355259 | A1 | 12/2014 | Ku et al. | |

FOREIGN PATENT DOCUMENTS

| | | | |
|---|---|---|---|
| CN | 207740978 U | | 8/2018 |
| CN | 108895389 A | | 11/2018 |
| CN | 109163287 A | * | 1/2019 |
| CN | 208442738 U | | 1/2019 |
| CN | 208442739 U | * | 1/2019 |
| CN | 208687615 U | | 4/2019 |
| CN | 215174710 U | * | 12/2021 |

* cited by examiner

SOLAR STREET LAMP

CROSS-REFERENCE TO RELATED APPLICATIONS

This application is a continuation of U.S. Non-Provisional application Ser. No. 17/145,246 filed 8 Jan. 2021, which claims the benefit of priority to U.S. Provisional Patent Application No. 62/958,710 filed 8 Jan. 2020; said U.S. Both applications are incorporated in their entirety herein.

BACKGROUND

Field of the Art

The present invention relates to the technical field of illumination, and in particular, to a solar street lamp which can be easily assembled and disassembled.

Discussion of the State of the Art

Typical solar street lamps use solar radiation energy as energy. In this type of street lamp, a solar panel is often used to convert solar energy to charge a battery during the day, and the battery is used to supply power to a light source for lighting at night. However, in a conventional solar street lamp, the battery and power supply of current solar street lamps are usually installed inside a housing. During disassembly, assembly, and replacement, a lift system is usually required for maintenance operations, often at considerable height above the ground. Moreover, the solar panel at the top or the upper housing must be disassembled before being replaced. The solar panel and the upper housing are often large in size, complicated in disassembly and assembly, and troublesome in operation. As a result, the efficiency of disassembly, assembly, and replacement of the lamp is adversely affected and the risk is increased for maintenance operations typically occurring at considerable height above ground level.

SUMMARY

The present invention provides a solar street lamp which can be disassembled and assembled easily and which provides easy access to the battery and power supply.

The present invention is also appealing because the front end of the solar street lamp that has the light emitting elements is thin because the battery and power supply are not mounted in the space between the solar panel and a bottom plate supporting the light emitting elements. Instead, in an exemplary embodiment of the present invention, the battery and power supply are mounded in a mounting chamber space between the bottom plate supporting the light emitting elements and the fixture used as a connecting base to mount the solar street lamp on top of a support pole or post. Additionally, maintenance efficiency of the solar street lamp is improved because the disassembly, assembly, and replacement of the battery and the power supply can be conducted after simply opening a rear plug that allows access to the mounting chamber supporting the battery and power supply and that allows the solar panel to be slipped out if required for a maintenance procedure.

In one embodiment, the connecting base is further comprised to have an access port for the mounting chamber such that the rear plug configured for sealing the back area of the wire gap space is further configured to seal the access port for the mounting chamber such that removing the rear plug provides an access to the mounting chamber of the connecting base for servicing the battery and power supply.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. It should also be noted, that, although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Apparatuses and elements thereof that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application do not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

BRIEF DESCRIPTION OF THE FIGURES

The accompanying drawings illustrate several embodiments and, together with the description, serve to explain the principles of the invention according to the embodiments. It will be appreciated by one skilled in the art, that the particular arrangements illustrated in the drawings are merely exemplary and are not to be considered as limiting of the scope of the invention or the claims herein in any way.

FIGS. 1-4 illustrate various elements and embodiments of the inventive apparatus, the elements of which are describe in detail below.

DETAILED DESCRIPTION

Figure 1:
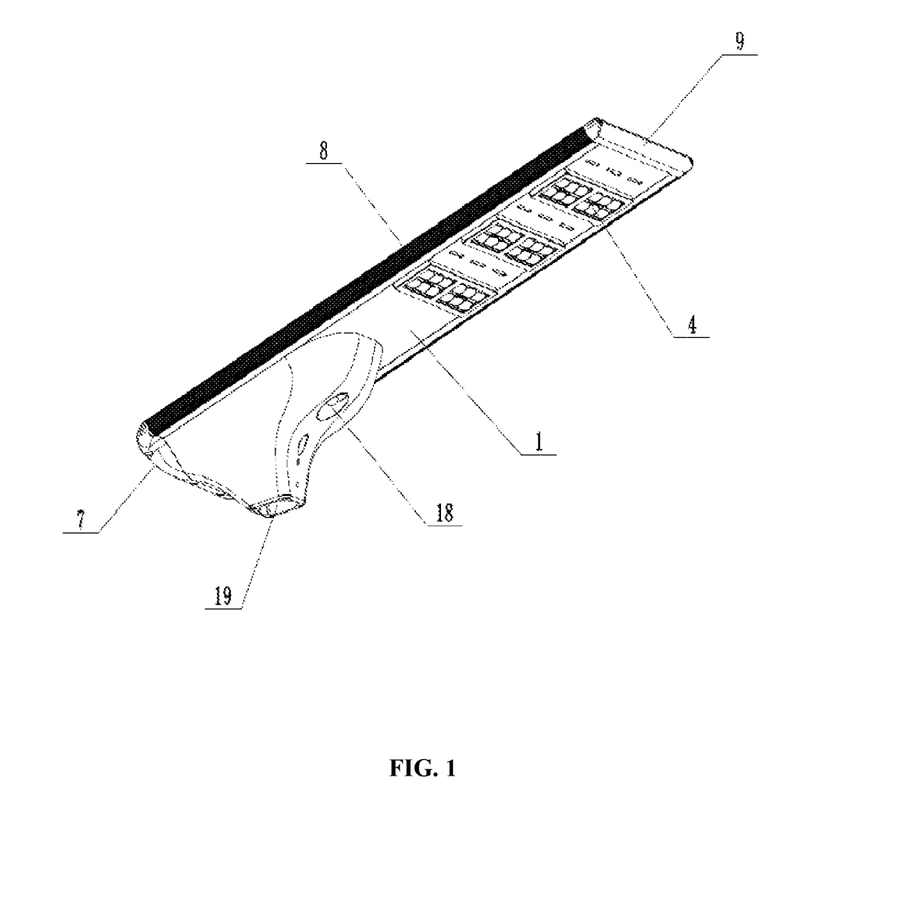
FIG. 1 is a three-dimensional perspective view of an example of the inventive apparatus.
Figure 2:
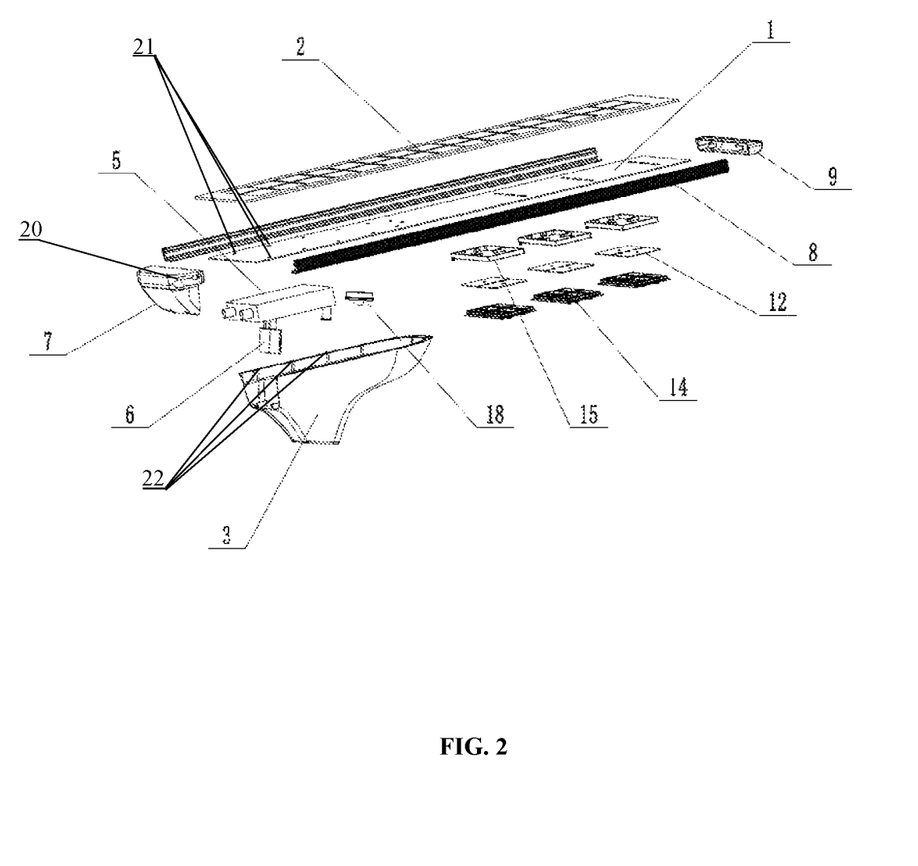
FIG. 2 is an exploded view of FIG. 1.

As shown in FIGS. 1-4, as perhaps best demonstrated by FIG. 2, the inventive apparatus may be comprised of the following elements: a bottom plate 1 that supports the light-emitting modules 4, a solar panel 2, a connecting base 3 that is used to mount the solar street lamp onto, for example, a pole or post (not shown in the figures) using the mounting hole 19 located on the bottom side of the connecting base 3, light-emitting modules 4, a battery 5 and a power supply 6, a control module 18 for controlling brightness of the light emitted from the light-emitting modules 4, a front plug 9 and a rear plug 7, as well as connecting side bars 8, each connecting side bar 8 including first slots 10 and second slots 11 (see FIG. 4) for supporting the edges of the solar panel 2 and the bottom plate 1.

In one exemplary embodiment of the invention, the solar panel 2 may be mounted above the bottom plate 1 with a gap as configured between the solar panel 2 and the bottom plate 1 to accommodate interconnecting wiring, referred to herein as the wire gap (the wiring is not shown in the figures). Since one having ordinary skill in the art understands that wiring for devices such as the solar street lamp of the present invention involves relative small wiring size, it should be clear that the combination of the solar panel 2 and bottom plate 1 provides a relatively thin structure. The light-emitting modules 4 are fixedly mounted at a lower surface of the bottom plate 1, in a forward portion of the bottom plate 1. It is noted that the term "forward portion" or "front" refers to the portion of the bottom plate 1 on the right side in FIG. 1, so that the term "rear end portion" or "aft portion" of the bottom plate 1 refers to the portion on the left side of the figure.

The connecting base 3 is used to mount the solar street lamp on top of a mounting pole (not shown in the figures). The upper end of the connecting base 3 connects with a rear end portion of the bottom plate 1, to thereby provide support for the bottom plate 1. The connecting base 3 is configured to include a mounting chamber in which the battery 5 and the power supply 6 are mounted as being inside the connecting base 3 and below the bottom plate 1. This technique of mounting the battery 5 and power supply 6 below the bottom plate 1 permits the solar panel 2 to be minimally separated from the light-emitting modules 4 to provide the thin appearance of the front end of the solar street lamp of the present invention and described herein as approximately thickness of a wire gap size.

The connecting base 3 includes a mounting port 19 disposed at its bottom side, facing away from the bottom plate 1, and used to mount the solar street lamp onto a mounting pole or post. Rear plug 7 is detachably disposed on the rear side of the connecting base 3 and serves as a seal for the upper side of connecting base 3 when attached and, when detached from the connecting base 3, permits easy access to the battery 5 and power supply 6 mounted inside the connecting base 3 for purpose of maintenance, replacement, or repair. A switch button 20 for controlling the power supply 6 may be disposed on the rear plug 7. The rear plug 7 also serves as a rear seal for the wire gap space between the bottom plate 1 and the solar panel 2.

As shown in FIG. 2, the aft or rear portion of the bottom plate 1 can be fastened to the top surface of the connecting base 3 using fasteners such as screws (not shown in the figures) and the mounting holes 21 formed in the aft portion of the bottom plate 1 that correspond to a matching pattern of screw holes 22 in the upper surface of the connecting base 3. The exploded view in FIG. 2 also shows that, once the rear plug 7 is detached, the solar panel 2 could then slide in the aft direction in its supporting groove 11 in the two connecting side bars 8.

Figure 3:
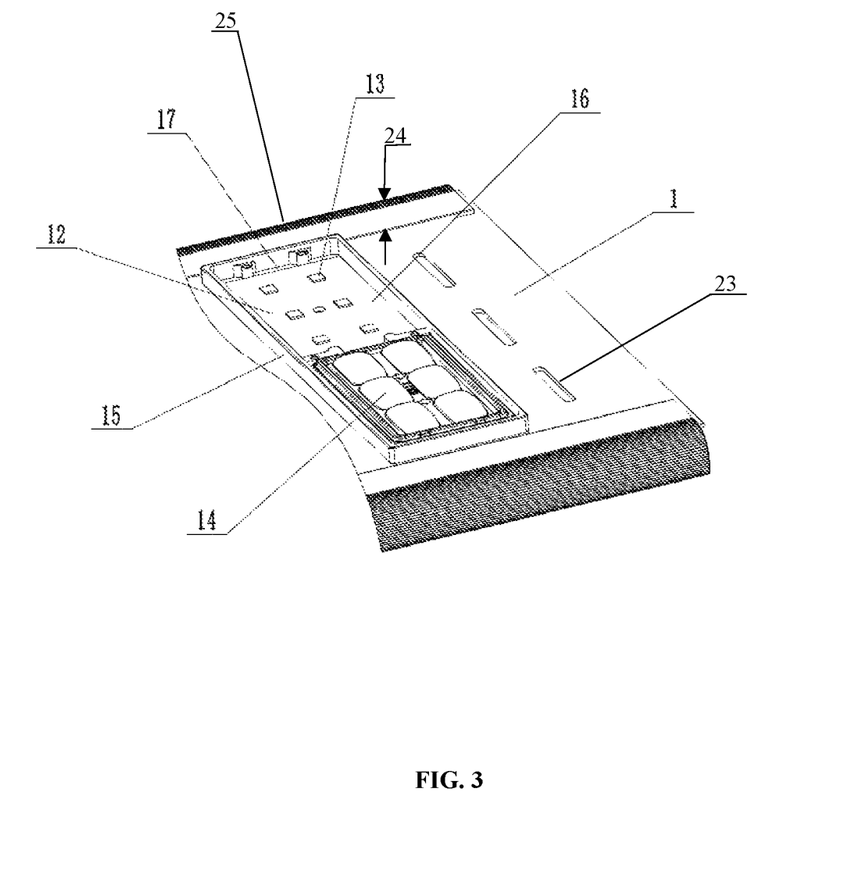
FIG. 3 shows an exemplary embodiment of a connection structure of light-emitting modules with a bottom plate.

As exemplarily shown in FIG. 3 showing exemplary details of the bottom plate 1 in the front area where the light-emitting elements are mounted, wire holes 23, a wiring gap 24, and the mounting chamber 25 are formed in the bottom plate 1. With the adoption of the wiring gap 24 as the dimension for separation of the bottom plate 1 and the solar panel 2, the arrangement of interconnecting wires is facilitated. One end of each wire of the interconnecting wires is connected with one of the light-emitting modules 4 through the wire holes 23, and the other end of the wires are connected with the power supply 6 through the wire holes

23. It is again noted that one of ordinary skill understands the term "wiring gap" as referring to a predetermined gap size relative to the diameter of wires being used in a specific application, with an intent to keep the gap size 24 as minimal in view of laying out the interconnecting wires to the intended destinations, and one of ordinary skill would recognize that the gap size 24 is approximately two or three times the width of the wire holes 23. It is also noted that, for sake of simplicity, no wires are shown in the figures but one of ordinary skill would recognize that wires are used to interconnect the solar panel 2, the battery 5, the power supply 6, and the light-emitting modules 4. By mounting the battery 5 and the power supply 6 in the mounting chamber between the connecting base 3 and the bottom plate 1, no large space is required to be disposed between the bottom plate 1 and the solar panel 2 for mounting the battery 5 and the power supply 6 as is common in conventional designs.

As seen in FIG. 2, in one exemplary embodiment of the inventive apparatus, the solar street lamp may include two connecting bars 8, used to support the side edges of the solar panel 2 and base plate 1, and a front plug 9, used to support the front edges of the solar panel 2 and base plate 1. The bottom plate 1 and the solar panel 2 may be rectangular or square plate bodies that are parallel to each other by reason of being mounted in the grooves 10, 11 of the connecting bars 8. The two connecting bars 8 are disposed at the two sides of the bottom plate 1 respectively, for sealing openings at two sides of the wiring gap. The front plug 9 is disposed at the front end of the bottom plate 1, and the front plug 9 and the rear plug 7 also therefore seal openings at the front and rear ends of the wiring gap space separating the base plate 1 and solar panel 2.

Figure 4:
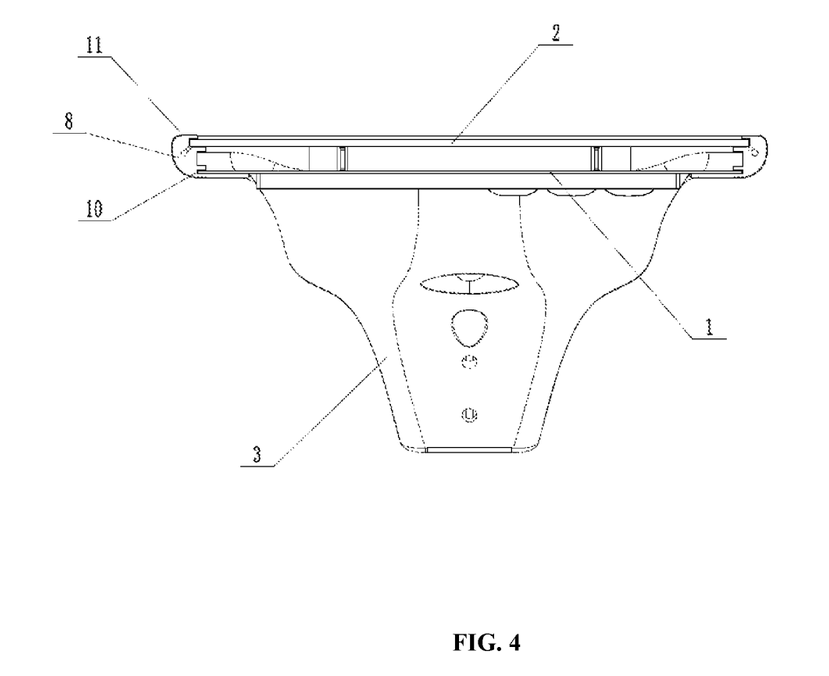
FIG. 4 shows a view looking at the front end of the solar street lamp after the front plug has been detached from the solar street lamp.

Additionally, as shown in FIGS. 2 and 4, the sides of the two connecting bars 8 are formed to include first slots 10 into which side edges of the bottom plate 1 are inserted. The front plug 9 and the rear plug 7 may abut against and limit two ends of the bottom plate 1 respectively. By inserting the two side edges of the bottom plate 1 into the first slots 10 in the two connecting bars 8, and clamping and limiting the two ends of the bottom plate 1 with the front plug 9 and the rear plug 7, the mounting of the bottom plate 1 is realized. This configuration provides a mounting structure that is stable and that is convenient for disassembly and assembly. In some exemplary embodiments, the aft end of the bottom plate 1 can have holes 21 for mounting the bottom plate 1 securely to the top surface of the connecting base 3, using, for example, screws that thread into corresponding threaded holes 22 in the top surface of the connecting base 3.

As further seen in FIGS. 2 and 4, second slots 11 are also formed in the connecting bars 8, into which side edges of the solar panel 2 are inserted. The front plug 9 and the rear plug 7 abut against and limit the two ends of the solar panel 2 respectively. By inserting the two side edges of the solar panel 2 into the second slots 11 in the two connecting bars 8 and clamping and limiting the two ends of the solar panel 2 with the front plug 9 and the rear plug 7, the mounting of the solar panel 2 is realized.

FIG. 1 illustrates that the front plug 9 and the rear plug 7 are configured to fit into a connection that threads with the two ends of the connecting bars 8, respectively. Connecting holes are formed in the connecting bars 8 and penetrate through in length directions of the connecting bars 8, so that hole positions for mounting the front plug 9 and the rear plug 7 are formed in the two ends of the connecting bars 8.

FIGS. 1 and 3 show an exemplary embodiment of the light-emitting modules 4. For purposes of explanation, this light-emitting module example uses a Light Emitting Diode (LED) as a light source. Nevertheless, it should be noted that the invention disclosed herein is not limited to the use of LEDs as a light source and is not limited to any LED-related components. In one exemplary embodiment of the inventive apparatus, as shown in FIG. 2, the light-emitting module 4 may include a Printed Circuit Board (PCB) 12, a plurality of LED chips 13 mounted on the PCB 12, and a lens 14 mounted in front of the PCB 12.

FIG. 3 further illustrates the exemplary embodiment of the light-emitting module by illustrating that a limiting frame 15 may be fixedly mounted on the lower surface of the bottom plate 1. A mounting groove 16 is configured between the limiting frame 15 and the bottom plate 1. The PCBs 12 and the lenses 14 are disposed in the mounting grooves 16. The edges of the lenses 14 fit with bottom surfaces of the mounting grooves 16. Glue filling gaps 17 are formed between the lenses 14 and the mounting grooves 16, wherein the glue filling gaps 17 are filled with glue and the glue coats the edges of the lenses 14 so that the lenses 14 are fixedly mounted in the mounting grooves 16. By filling in the glue filling gaps 17 with the glue and allowing the glue to coat the edges of the lenses 14, gaps between the lenses 14 and the mounting grooves 16 are sealed, and the lenses 14 are fixed to the bottom plate 1 without adopting bolts or screws for fixing the lenses so that the operation is convenient, the production efficiency is high, and the effects of improving the sealing and possible waterproofing properties of the light-emitting modules 4 are achieved. The limiting frame 15 is used to control the disbursement of the glue and thereafter the glue is solidified and formed in the glue filling gap, and the structural strength of the filling glue is improved, so that the usage amount of the glue is reduced, and the production cost is lowered.

Although filling glue is described above as a means of mounting the lenses, other ways of attaching the mounting lenses and other components may be used as would be readily apparent and understood by a person of ordinary skill in the art.

FIGS. 1 & 2 illustrate a control module 18 which is disposed on the connecting base 3 and that is configured to automatically control the light emission brightness of the light emitting module 4. When no person or other object passes an area covered by the solar street lamp, the light emitting modules 4 may produce relatively low illumination brightness or may even not emit any light at all. When a person or other object passes into an area covered by the solar street lamp, the light emitting modules 4 are then controlled to automatically increase the illumination brightness.

One exemplary embodiment of the control module 18 includes a microwave emitter, a microwave inductor, an arithmetic comparator, and a control circuit which is connected with the light emitting modules 4. The microwave emitter can generate a microwave that reaches a substantial and reasonable distance and it may be able to generate a substantial and reasonable elliptical microwave coverage area which may be adjusted in an axial direction by a micro-loop antenna. When the person or other object passes into the coverage area, return waves emitted by the microwave emitter change by interfering with original microwave frequency generated by the microwave inductor, such that a variable quantity may be detected, amplified, shaped, and subjected to multiple comparison and delayed time processing by the arithmetic comparator and then is output to form a control signal. The control circuit receives the control signal to control the brightness of a light-emitting module 4, so that the purpose of electric power conservation is achieved.

FIG. 1 illustrates the mounting hole 19 in the connecting base 3, where the mounting hole 19 is disposed at the bottom of the connecting base 3 to connect with, for example, a lamp post. The mounting hole 19 may be angled between an axis of the mounting hole 19 and a bottom surface of the bottom plate 1, so that after the installation of the solar street lamp, no angle adjustment is required to have the light-emitting elements 4 in a desired orientation relative to the desired area of illumination, and the installation is stable.

The inventive apparatus may be varied in shape, size, and composition as would be readily apparent to a person of ordinary skill in the art, without departing from the scope of the invention.

As would be understood from the entirety of the disclosure, the examples provided herein are merely considered to illustrative for the inventive apparatus. The invention disclosed herein is not limited to the aforementioned elements, components, configurations or processes, and modification or equivalent replacements may be made without departing from the scope and spirit of the disclosure. It should also be noted that the inventive apparatus may be configured to accommodate the specific needs of a user and varying the apparatus from the disclosure herein will not depart from the scope of the invention.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A solar street lamp, comprising:
a solar panel to convert sunlight into electrical energy;
a plurality of light-emitting modules that emit light using the energy converted by the solar panel, the light-emitting modules being mounted on a bottom surface of a bottom plate;
first and second connecting bars each having an upper groove for supporting a side edge of the solar panel and a lower groove for supporting a side edge of the bottom plate, wherein the first and second connecting bars are configured to support the solar panel and the bottom plate a predetermined minimal separation based on a wire gap space used to interconnect components of the solar street lamp, the first and second connecting bars serving to seal sides of the wire gap space;
a front plug disposed at a front end of the bottom plate, for sealing a front of the wire gap space;
a rear plug disposed at a rear end of the bottom plate, for sealing a rear of the wire gap space;
a battery to receive and store the energy converted by the solar panel;
a power supply that provides power from the battery to the light-emitting modules, the battery and power supply being mounted in the solar street lamp below the bottom plate; and
a connecting base for mounting the solar street lamp on top of a mounting pole or post, the connecting base configured to have:
a mounting port comprising an opening on a bottom side of the connecting base, to fit over a top of the mounting pole or post;
an upper surface configured to support a rear portion of the bottom plate; and
a mounting chamber configured to mount the battery and the power supply as being mounted below the bottom plate of the solar street lamp,
wherein the connecting base is further comprised to have an access port for the mounting chamber such that the rear plug configured for sealing a back area of the wire gap space is further configured to seal the access port for the mounting chamber such that removing the rear plug provides an access to the mounting chamber of the connecting base for servicing the battery and the power supply.

2. The solar street lamp of claim 1, further comprising a control module mounted in the mounting chamber of the connecting base, to automatically control an illumination brightness of the light-emitting modules.

3. The solar street lamp of claim 2, wherein the control module comprises:
a microwave emitter;
a microwave inductor;
an arithmetic comparator; and
a control circuit which is connected with the light emitting modules.

4. The solar street lamp of claim 1, wherein the mounting hole at the bottom of the connecting base is configured to be fixedly connected with a top of a lamp post and an included angle between an axis of the mounting hole and a bottom surface of the bottom plate is predetermined to aim the light-emitting elements in a predetermined desired orientation without any adjustment.

5. A solar street lamp, comprising:
a solar panel supported above a bottom plate at a predetermined distance based on a wire gap space minimally needed to provide interconnection wiring for components of the solar street lamp, the bottom plate having mounted on a bottom surface of a front portion thereof a plurality of light-emitting modules;
a connecting base upon which the bottom plate is supported in a rear portion of bottom base, the connecting base configured with a mounting chamber inside of which mounting chamber are mounted a battery to store energy converted by the solar panel and a power supply to supply power to the light-emitting modules;
a front plug disposed at a front end of the bottom plate, for sealing a front of the wire gap space; and
a rear plug disposed at a rear end of the bottom plate, for sealing a rear of the wire gap space,
wherein the solar panel is supported above the bottom plate using first and second connecting bars each having an upper groove for supporting a side edge of the solar panel and a lower groove for supporting a side edge of the bottom plate, the first and second connecting bars providing side seals for the wire gap space,
wherein the mounting chamber of the connecting base has an access opening that is covered by the front plug when the front plug is attached, and
wherein, when the front plug is detached, the access opening of the mounting chamber permits access to service the battery and power supply.

* * * * *